(12) United States Patent
Johnson et al.

(10) Patent No.: US 6,236,440 B1
(45) Date of Patent: May 22, 2001

(54) DISPLAY DEVICE IN WHICH ONE OF THE TWO ELECTRODES OF A PIXEL IS COATED WITH A DIPOLE MATERIAL TO EQUALIZE THE ELECTRODE WORK FUNCTIONS

(75) Inventors: Mark T. Johnson; Adrianus A. Van Der Put; Gerard Cnossen; Michael Buchel; Josephus P. A. Deeben, all of Eindhoven (NL); Tom Marshall, Hartsdale, NY (US); Kevin W. Haberern, Cary, NC (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/120,511

(22) Filed: Jul. 22, 1998

(51) Int. Cl.[7] .................... G02F 1/1333; G02F 1/1343
(52) U.S. Cl. ............................ 349/122; 349/139
(58) Field of Search .................. 349/32, 147, 148, 349/122, 138, 139

(56) References Cited

U.S. PATENT DOCUMENTS 5,327,272 * 7/1994 Fujiwara et al. ............... 349/139
5,667,705 * 9/1997 Mlyazaki et al. ............... 349/139
5,705,826 * 1/1998 Aratani et al. ................. 349/43
5,764,324   6/1998 Lu et al. ......................... 349/113
5,838,398 * 11/1998 Ilcisin et al. .................... 349/32

FOREIGN PATENT DOCUMENTS 10054995A   2/1998 (JP) .

* cited by examiner

Primary Examiner—Walter J. Malinowski
(74) Attorney, Agent, or Firm—Aaron Waxler

(57) ABSTRACT

In a display device comprising a first substrate having at least one transparent, first picture electrode of a first material, a second substrate comprising at least one second picture electrode of a second material which, jointly with the picture electrode on the first substrate and an intermediate opto-electronic material, defines a pixel, and means for supplying electric voltages to the picture electrodes, the work function between the two picture electrodes is decreased in that at least one of the picture electrodes is coated with at least one layer of conducting material, or a layer of a material comprising a dipole.

6 Claims, 3 Drawing Sheets

DISPLAY DEVICE IN WHICH ONE OF THE TWO ELECTRODES OF A PIXEL IS COATED WITH A DIPOLE MATERIAL TO EQUALIZE THE ELECTRODE WORK FUNCTIONS

BACKGROUND

The invention relates to a display device comprising a first substrate having at least one transparent, first picture electrode of a first material, a second substrate having at least one second picture electrode of a second material which, jointly with the picture electrode on the first substrate and an intermediate opto-electronic material, defines a pixel, and means for supplying electric voltages to the picture electrodes.

The invention also relates to a display device comprising a first substrate having at least one transparent, first picture electrode of a first material, a second substrate having a channel plate coated with a dielectric layer, in which a channel provided with channel electrodes, jointly with the picture electrode on the first substrate and an intermediate opto-electronic material, defines a pixel, and means for driving the pixel.

Display devices of this type are generally known and usually comprise a large number of pixels. The first type comprises, for example, LCDs, both of the active and the passive type; the second type comprises plasma-addressed liquid crystal display devices referred to as PALC displays.

Notably when the second picture electrode is reflective, the drive of these display devices appears to be sensitive to the alternating supply of positive and negative voltages across the pixels. This becomes manifest as, for example, flicker. In a picture period, in which a positive voltage is written, the same picture information leads to a different voltage across the pixel than in the subsequent picture period in which a negative voltage is written. At a frame frequency of, for example 60 Hz, this leads to a flicker frequency of 30 Hz, which is clearly noticeable in the picture. The display devices also often suffer from image retention. In this application, reflecting picture electrodes are also understood to mean partially reflecting, semitransparent electrodes as are used in transflective display devices.

OBJECTS AND SUMMARY OF THE INVENTION

It is an object of the invention to partly or entirely obviate one or more of said problems.

A first embodiment of a display device according to the invention is therefore characterized in that at least one of the picture electrodes is coated with at least one layer of conducting material, such that the difference in work function between the two picture electrodes is decreased.

A second embodiment of a display device according to the invention is characterized in that at least one of the picture electrodes is coated with at least one layer of a material comprising a dipole, such that the difference in work function between the two picture electrodes is decreased.

The embodiment of a display device according to the invention, based on plasma addressing, is characterized in that the picture electrode, the dielectric layer or at least one channel electrode is coated with at least one layer of material modifying the work function.

The invention is based on the recognition that said image-disturbing phenomena (flicker) result from an initial internal DC voltage across the electro-optical layer. In its turn, this voltage gives rise to ion movements which lead to image retention or cause said transient effect.

Said voltage is presumably the result of the difference in work function between the materials of the two picture electrodes, for example ITO for the transparent picture electrode and aluminum for the reflective picture electrode. Such an asymmetrical structure thus leads to an internal DC voltage which, according to the invention, is neutralized by coating one of the picture electrodes with a layer of conducting material or a layer of material comprising a dipole, for example, an organic material having a low electric conductance, such that the difference in work function between the two picture electrodes is decreased. Experiments have proved that the difference in work function, dependent on the materials used, can be reduced to less than 0.25 eV.

Since also PALC display devices have an asymmetrical structure (a liquid crystal layer between a microsheet and an electrode) there is also such an internal DC voltage in this case which, according to the invention, is neutralized by coating the picture electrodes, the microsheet or the channel electrodes with at least one layer of material modifying the work function of the material of said picture electrodes, microsheet, or channel electrodes.

The difference in work function may be decreased in different ways, for example, by coating the transparent picture electrode with a layer comprising at least a thin layer of the material of the reflecting picture electrode, or by coating the reflecting picture electrode with a layer comprising at least a layer of conducting material having substantially the same work function as that of the transparent picture electrode. An example of the latter case is the use of a thin layer of gold on a silicon wafer on which, for example, reflecting aluminum electrodes are realized, while switching elements (transistors) are realized in the subjacent silicon. If the gold is several monolayers thick, there is hardly any lateral conductance and this layer does not need to be split up into separate pixels.

The reflecting picture electrode as well as the transparent picture electrode may be coated with a layer comprising at least a layer of the same conducting material.

Also when using (organic) material with a dipole, which is preferably chosen from the group of polyimides or polyamide acids comprising or not comprising fluorine, the reflecting picture electrode and the transparent picture electrode may be coated with a layer comprising at least a layer of the same (organic) material with a dipole, the material on one of the two picture electrodes having been subjected to, for example, an UV treatment when these electrodes are coated with a layer comprising at least a layer of the same (organic) material with a dipole.

If desired, the layer of material with a dipole may function as a orientation layer.

These and other aspects of the invention are apparent from and will be elucidated with reference to the embodiments described hereinafter.

BRIEF DESCRIPTION OF THE DRAWINGS

In the drawings.

The Figures are diagrammatic and not to scale. Corresponding components generally have the same reference numerals.

DESCRIPTION OF THE PREFERRED EMBODIMENTS

Figure 1:
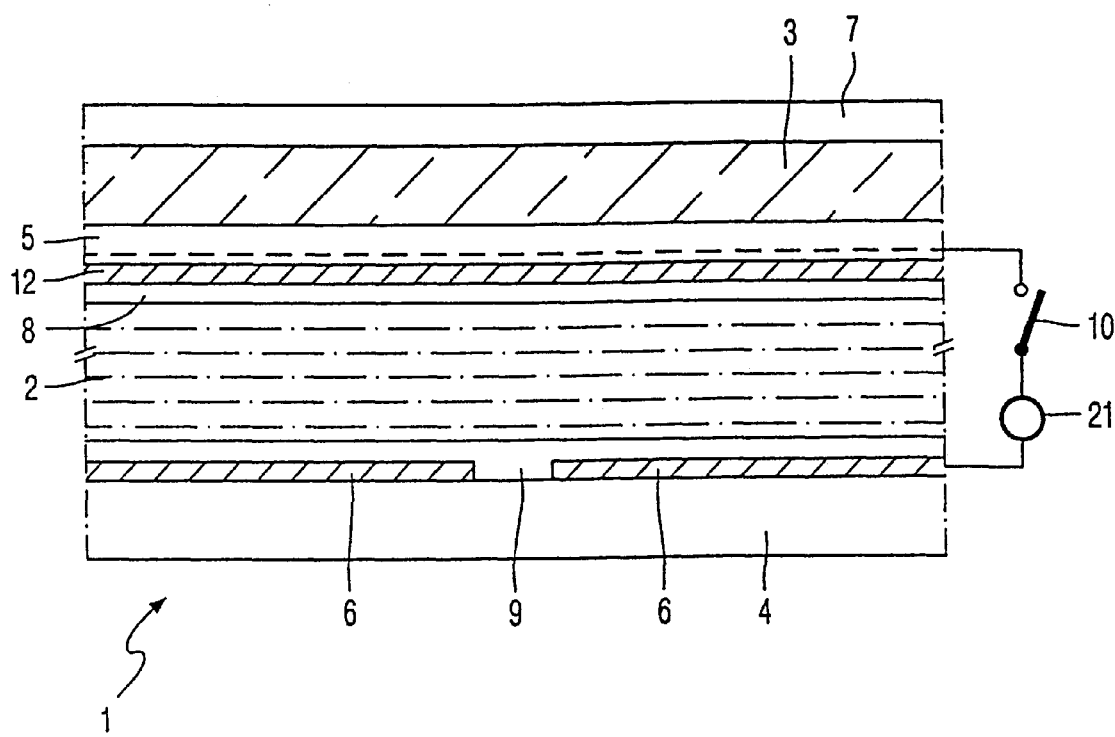
FIG. 1 is a cross-section of a part of a display device according to the invention.

FIG. 1 is a cross-section of a part of a display device comprising an electro-optical display cell, in this example a liquid crystal cell 1 with a twisted nematic liquid crystal material 2 present between a first transparent substrate 3 of, for example, glass comprising an electrode 5, and a second substrate 4. The electrode 5 is made of a light-transmissive material, for example indium tin oxide (ITO). The second substrate 4 comprises electrodes 6 of a reflecting or diffuse reflecting material such as, for example aluminum. The second substrate 4 is opaque in this example and may consist of various materials, for example, a silicon wafer in which switching elements are integrated.

Different electro-optical effects may be used, particularly liquid crystal effects such as (S)TN, guest-host, PDLC, ferro-electrics, VAN, reflective OCB, HAN. Dependent on the effect used, the device comprises a polarizer 7. In this example, the device also comprises orientation layers 8, 9 which orient the liquid crystal material on the inner walls of the substrates, such that the cell has a twist angle of approximately 90° in this example. The display device comprises drive means for supplying drive voltages to the electrodes 5, 6. These drive means are diagrammatically indicated by means of the switch 10 and a voltage source 21 in FIG. 1. In this first example, the ITO layer 5 is coated with a second metal layer 12 of aluminum.

The work function, both with and without the metal layer 12, was measured of the first substrate 3 coated with an ITO layer 5 and an orientation layer 8. For such a measurement (the Kelvin method), a vibrating gold plate is placed opposite the substrate at a small distance (0.1 mm), while an electric voltage is supplied between the plate and the ITO electrode. The vibration of the plate causes a changing capacitance, which gives rise to a current which is eliminated by means of a counter voltage which is a measure of the work function. Similarly, the work function was measured of the second substrate 4 coated with an aluminum pattern 6 and an orientation layer 9. Due to the presence of the metal layer 12, the difference in work function of the substrates 3, 4 had decreased considerably.

Subsequently, the flicker was measured of the finished cell filled with liquid crystal material. This can be done optically by applying a square-wave voltage with an identical positive and negative amplitude across a pixel, by measuring the flicker (for example, by means of an exposure meter) and by giving such an offset that the flicker is substantially invisible. Another method is purely electrical but only suitable for active drive. In this method, the voltage variation during non-selection across a pixel is fixed by means of sample-and-hold circuits. Voltage differences which occur during a negative and a subsequent positive field or frame are mutually compared whereafter, if necessary, an offset voltage is introduced to eliminate the voltage differences. It was found that the required offset voltage for avoiding flicker had substantially the same value as the difference in work function of the substrates 3, 4. By minimizing this difference, in this case by providing the aluminum layer 12, the internal DC voltage (and hence flicker, but also image retention and said transient phenomena) are thus reduced considerably.

Figure 2:
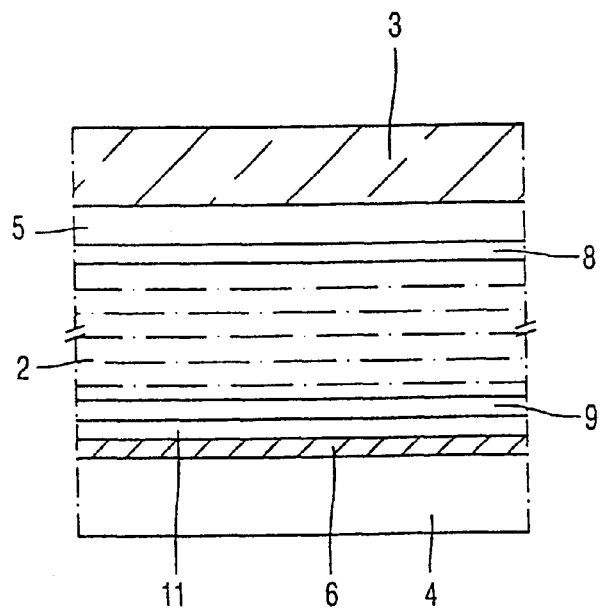
FIGS. 2, 3, 4, 5 and 6 are variants of FIG. 1.

With a view to transparency, the aluminum should not be too thick (several monolayers). However, thin layers of aluminum tend to react with the ITO while forming aluminum oxide. This has a different work function and, moreover, the conductance is reduced. Another possibility is shown in FIG. 2, in which the difference in work function of the substrates 3, 4 has decreased considerably by coating the aluminum electrode with a second ITO layer 11. A thin layer of a less reactive material, such as silver, may be alternatively used as an intermediate layer. For the sake of simplicity, the polarizer 7 and the switch 10 have been omitted in FIGS. 2, 3, 4 and 5. The original potential difference (the DC offset voltage) of 0.8 V was reduced to <0.1 V in such a device.

The metal layer 12 shown in FIG. 1 is replaced in another example by (or, if necessary, coated with) a metal layer whose material has a substantially identical work function such as, for example, molybdenum, chromium, tungsten, silver or gold, if the metal layer 12 consists of aluminum.

The transparent conductor 5 may be alternatively manufactured from a different material than ITO but with a substantially identical work function, such as $SnO/In_2O_3$ or polyaniline.

In yet another example, the metal layer 12 consists of a thin double layer. The ITO is coated with a thin layer of a metal which does not react with ITO such as, for example, molybdenum, chromium, tungsten or titanium, which layer in its turn is coated with a thin layer of aluminum.

Figure 3:
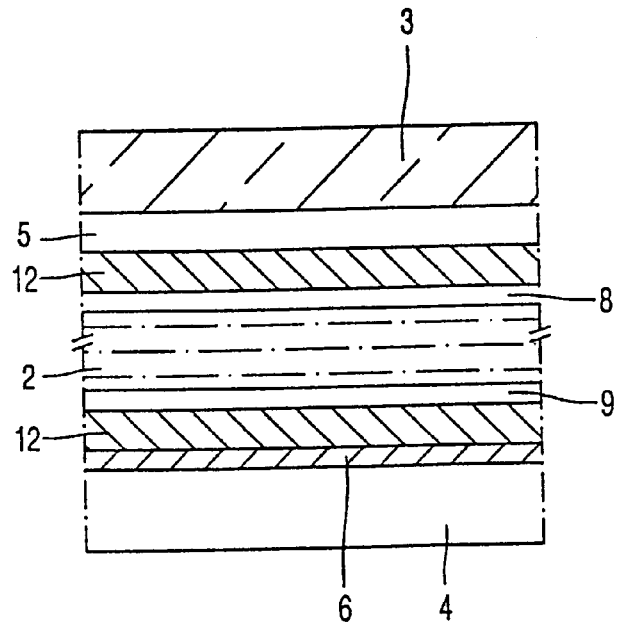

A further possibility is shown in FIG. 3, in which the difference in work function of the substrate 3, 4 has decreased considerably by coating both the aluminum electrode 6 and the ITO electrode 5 with a layer 12 of the same metal. This metal is chosen from material which preferably does not react with ITO, for example, from the group of molybdenum, copper, tungsten and titanium; double layers are alternatively possible. The layer on the ITO must of course be thin enough to pass light.

Figure 4:
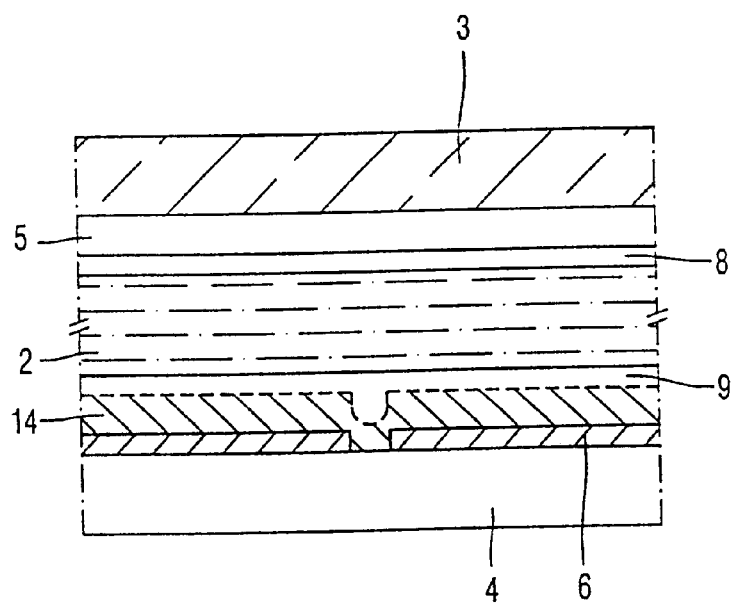

In the device of FIG. 4, a silicon wafer is used for the substrate 4, in which switching elements (not shown) energizing the switching electrodes 6 are realized. The switching electrodes are mutually separated, while the entire wafer is coated with a metal layer 14 of gold which is only several monolayers thick. By coating the surface with gold, the reflectivity is hardly influenced. Besides, the layer is so thin that no or hardly any lateral conductance occurs; the voltage across an electrode 6 is thus entirely determined by a subjacent switching element. Gold has substantially the same work function as ITO so that a symmetric reflective display cell is obtained which may be used notably in projection applications. The DC offset voltage was reduced from 0.8 V to values below 0.25 V.

Figure 5:
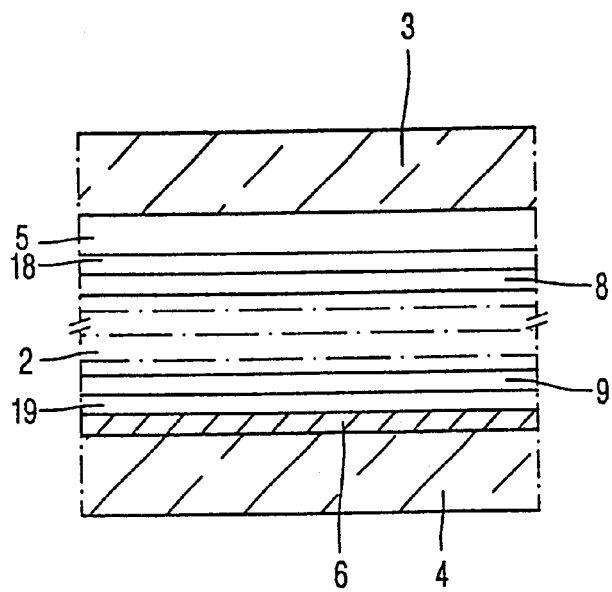

FIG. 5 is a cross-section of a part of a display device comprising an electro-optical display cell, in this example a liquid crystal cell 1 with a twisted nematic liquid crystal material 2 which is present between a first transparent substrate 3 of, for example glass comprising an electrode 5, and a second substrate 4 comprising an electrode 6. The electrodes are coated on at least one substrate with layers 18, 19 of an organic material increasing or decreasing the work function (for example, organic compounds comprising or not comprising fluorine). These materials have a small conductance and comprise an internal dipole. If desired, the layers 18, 19 are coated with layers 8, 9 of orienting material. If a polyamide acid material, a precursor polyimide, a material comprising fluorine, or (preferably) a polyamide acid material comprising fluorine is chosen, for layer 18 the work function of the aluminum is increased to approximately that of the ITO. An example is a polyimide of pyromeeletic dianhydride and 2.2-bis[4-(4-aminophenoxy)phenyl]-hexafluoropropane.

A layer 18 of polyethyleneimine decreases the work function of the ITO. Both substrates may of course be coated with the same material comprising a dipole and multilayer structures are alternatively possible. The layers comprising the dipole are obtained in that compounds which constitute a permanent dipole in combination with the electrode material are used for the manufacture of said layers.

If necessary, the difference in work function is even further decreased by subjecting the display device, or at least one of the two substrates, to an UV treatment. Generally, this slightly decreases the work function of ITO.

Figure 6:
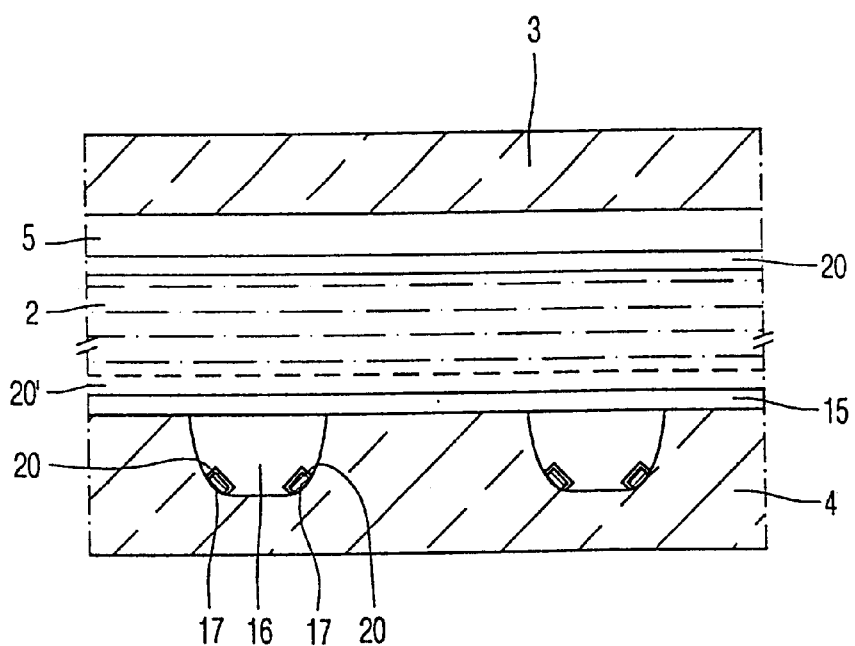

The invention is of course not limited to the examples shown. For example, in FIG. 5, the layers 18, 19 may be made of a material which is suitable as an orientation material for the liquid crystal material. The layers 8, 9 can then be dispensed with. The substrate 4 may also constitute, for example a channel plate for a display device of the Plasma-Addressed Liquid Crystal type (PALC). In that case, as shown in FIG. 6, the electrodes 6 are dispensed with and the substrate 4 is provided with elongated plasma ducts 16, covered by a microsheet 15. The DC offset voltage is decreased by coating the electrode 5 on the transparent substrate 3, the microsheet 15 or one or both electrodes 17 in the channels 16 with a layer 20 modifying their work function. (Dependent on its position in the device (either on electrode 5, on the microsheet or on a channel electrode) a material either decreasing or increasing the work function is chosen.) Combinations are alternatively possible.

As has been stated, the electrodes 6 may be transparent or have, for example a pattern of apertures for transflective display devices.

What is claimed is:

1. A display device comprising a first substrate having at least one transparent, first picture electrode of a first material of a first work function, a second substrate having at least one second picture electrode of a second material of a second work function different from the first work function, which second picture electrode, jointly with the at least one picture electrode on the first substrate and an intermediate opto-electronic material, defines a pixel, and means for supplying electric voltages to the picture electrodes, characterized in that at least one of the picture electrodes is coated with at least one layer of a material comprising a dipole, such that the difference in the work functions of the first and second materials is decreased.

2. A display device as claimed in claim 1, characterized in that the material comprising a dipole is chosen from the group of polyimides and polyamide acids.

3. A display device as claimed in claim 2, characterized in that the material having a dipole comprises fluorine-containing polyimides or polyamide acids.

4. A display device as claimed in claim 1, characterized in that the first picture electrode and the second picture electrode are coated with a layer comprising at least a layer of the same material having a dipole.

5. A display device as claimed in claim 1, characterized in that the first picture electrode and the second picture electrode are each coated with a layer comprising a layer of different materials having a dipole.

6. A display device as claimed in claim 1, characterized in that the first picture electrode and the second picture electrode are coated with a layer comprising at least a layer of the same material having a dipole, the material on one of the two picture electrodes being subjected to an UV treatment.

* * * * *